(12) United States Patent
Kick (10) Patent No.: US 9,934,243 B2
(45) Date of Patent: *Apr. 3, 2018

(54) SYSTEM, METHOD AND COMPUTER PROGRAM PRODUCT FOR PARTIALLY SYNCHRONOUS AND PARTIALLY ASYNCHRONOUS MOUNTS/UNMOUNTS IN A MEDIA LIBRARY

(71) Applicant: KIP CR P1 LP, New York, NY (US)

(72) Inventor: Damien Kick, Austin, TX (US)

(73) Assignee: KIP CR P1 LP, New York, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/741,220

(22) Filed: Jun. 16, 2015

(65) Prior Publication Data
US 2015/0286654 A1    Oct. 8, 2015

Related U.S. Application Data

(63) Continuation of application No. 14/271,130, filed on May 6, 2014, now Pat. No. 9,087,073, which is a
(Continued)

(51) Int. Cl.
*G06F 7/00* (2006.01)
*G06F 17/30* (2006.01)

(52) U.S. Cl.
CPC .. *G06F 17/30174* (2013.01); *G06F 17/30171* (2013.01)

(58) Field of Classification Search
CPC ......... G06F 17/30578; G06F 17/30174; G06F 17/30575; G06F 17/30371; G06F 11/1458
(Continued)

(56) References Cited

U.S. PATENT DOCUMENTS 8,335,761 B1 * 12/2012 Natanzon ............ G06F 11/1471
707/626
8,762,330 B1    6/2014 Kick
(Continued)

OTHER PUBLICATIONS

Office Action for U.S. Appl. No. 13/614,857, dated Aug. 27, 2013, 19 pgs.
(Continued)

*Primary Examiner* — Hosain Alam
*Assistant Examiner* — Nicholas Allen
(74) *Attorney, Agent, or Firm* — Sprinkle IP Law Group (57) ABSTRACT

Systems, methods and computer program products for determining completion of commands in a library system and providing an indication of the completion to a component of the media library system so that other commands which are dependent upon the completion can be efficiently issued and executed. In one embodiment, a tape is mounted in a drive of the library and a filesystem mount command is issued to initiate a filesystem mount operation. Diagnostic information generated by the operating system for this operation is communicated to the media library management application. When the filesystem mount process is completed, a corresponding diagnostic message is communicated to the media library management application. Until this message is received by the media library management application, commands that are dependent upon the completion of the filesystem mount process are inhibited, and afterward these dependent commands are allowed to be issued.

20 Claims, 4 Drawing Sheets

Related U.S. Application Data continuation of application No. 13/614,857, filed on Sep. 13, 2012, now Pat. No. 8,762,330.

(58) Field of Classification Search
USPC .......................................................... 707/613
See application file for complete search history.

(56) References Cited

U.S. PATENT DOCUMENTS

| | | | |
|---|---|---|---|
| 9,087,073 B2 | 7/2015 | Kick | |
| 2004/0133570 A1* | 7/2004 | Soltis | G06F 17/30194 |
| 2005/0256999 A1* | 11/2005 | Kishi | G06F 3/0607 |
| | | | 711/111 |
| 2006/0259949 A1* | 11/2006 | Schaefer | G06F 17/30082 |
| | | | 726/1 |
| 2007/0103984 A1* | 5/2007 | Kavuri | G06F 3/0605 |
| | | | 365/185.17 |
| 2007/0206591 A1* | 9/2007 | Doviak | H04L 12/5692 |
| | | | 370/389 |
| 2008/0086579 A1* | 4/2008 | Williams | G05B 19/0423 |
| | | | 710/61 |
| 2008/0114936 A1* | 5/2008 | Desai | G11B 15/689 |
| | | | 711/115 |
| 2008/0313403 A1* | 12/2008 | Niranjan | G06F 3/061 |
| | | | 711/120 |
| 2009/0006734 A1* | 1/2009 | Kishi | G06F 3/0611 |
| | | | 711/111 |
| 2009/0083501 A1* | 3/2009 | Friauf | G06F 3/0613 |
| | | | 711/158 |
| 2009/0193207 A1* | 7/2009 | Ogata | G06F 3/0611 |
| | | | 711/162 |
| 2009/0292957 A1* | 11/2009 | Bower | G06F 11/0727 |
| | | | 714/55 |
| 2010/0046108 A1* | 2/2010 | Anna | G11B 5/09 |
| | | | 360/53 |
| 2010/0185614 A1* | 7/2010 | O'Brien | G06F 17/30197 |
| | | | 707/736 |
| 2011/0145494 A1* | 6/2011 | Mitsuma | G06F 3/061 |
| | | | 711/111 |
| 2011/0153697 A1* | 6/2011 | Nickolov | G06F 9/4856 |
| | | | 707/827 |
| 2011/0157741 A1* | 6/2011 | Shiratori | G11B 5/00817 |
| | | | 360/77.12 |
| 2011/0219184 A1* | 9/2011 | Jaquette | G11B 27/002 |
| | | | 711/111 |
| 2012/0030423 A1* | 2/2012 | Kumagai | G06F 3/0619 |
| | | | 711/114 |
| 2012/0079223 A1* | 3/2012 | Jaquette | G06F 11/2094 |
| | | | 711/162 |
| 2012/0323934 A1* | 12/2012 | Amir | G06F 17/30091 |
| | | | 707/752 |
| 2012/0331021 A1* | 12/2012 | Lord | G06F 17/3015 |
| | | | 707/826 |
| 2013/0086022 A1* | 4/2013 | Black | G11B 27/36 |
| | | | 707/705 |
| 2014/0244577 A1 | 8/2014 | Kick | |

OTHER PUBLICATIONS

Office Action for U.S. Appl. No. 14/271,130, dated Nov. 26, 2014, 20 pgs.

Notice of Allowance for U.S. Appl. No. 14/271,130, dated Mar. 27, 2015, 6 pgs.

* cited by examiner

SYSTEM, METHOD AND COMPUTER PROGRAM PRODUCT FOR PARTIALLY SYNCHRONOUS AND PARTIALLY ASYNCHRONOUS MOUNTS/UNMOUNTS IN A MEDIA LIBRARY

CROSS-REFERENCE TO RELATED APPLICATIONS

This application is a continuation of, and claims a benefit of priority under 35 U.S.C. 120 of the filing date of U.S. patent application Ser. No. 14/271,130, filed May 6, 2014, entitled "SYSTEM, METHOD AND COMPUTER PROGRAM PRODUCT FOR PARTIALLY SYNCHRONOUS AND PARTIALLY ASYNCHRONOUS MOUNTS/UNMOUNTS IN A MEDIA LIBRARY," now U.S. Pat. No. 9,087,073, which is a continuation of U.S. patent application Ser. No. 13/614,857, filed Sep. 13, 2012, now U.S. Pat. No. 8,762,330, entitled "SYSTEM, METHOD AND COMPUTER PROGRAM PRODUCT FOR PARTIALLY SYNCHRONOUS AND PARTIALLY ASYNCHRONOUS MOUNTS/UNMOUNTS IN A MEDIA LIBRARY," all of which are fully incorporated by reference herein for all purposes.

TECHNICAL FIELD

This disclosure relates generally to the field of data storage, and more particularly to systems, methods and computer program products that enable partially synchronous and partially asynchronous mounting and unmounting of a filesystem such as an LTFS filesystem for accessing a tape in a drive of a media library.

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs, data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command (e.g., the SCSI "move medium" command) to the robot and the robot moves the tape cartridge, mounting the cartridge in the appropriate tape drive.

The Linear or Linear Tape File System (LTFS) Format Specification by IBM and the LTO Program (hereby fully incorporated by reference in its entirety for all purposes) defines a file system for LTO-5 tapes, LTO-6 tapes and may be extended to other tapes using an eXtensible Markup Language (XML) schema architecture. This file system support allows the use of an LTFS-formatted tape as if it were a file system. Files and directories may appear in a directory listing, files may be dragged and dropped from tape, data may be accessed at the file level, etc.

Consequently, while it previously was necessary to make use of a backup application to write and read tapes, the introduction of LTFS has simplified the storing and retrieval of files on tape by reducing such operations to a copy. Furthermore, any operating system that includes LTFS support can mount LTFS for a properly formatted tape and read and write the files thereon.

Before an LTFS tape can be used, it must be mounted in an LTFS-compatible tape drive, and the LTFS filesystem must be mounted. In this disclosure, the terms "file system" and "filesystem" may be used interchangeably. Once the LTFS filesystem has been mounted, files on the tape can be accessed in the same manner as files in other filesystems (e.g., written, read, dragged and dropped, etc.). When the tape is no longer needed, the LTFS filesystem is unmounted, and then the tape can be removed from the tape drive.

In some systems, the LTFS-compatible tape drives are accessed using Unix/Linux commands. The mounting and unmounting of the LTFS filesystem in these systems are asynchronous operations. In other words, when a mount or unmount command is issued, the operation is initiated, but the user does know when the operation is complete—no notification of the completion is provided by the operating system, and the operation does not complete with known timing. If a command which is dependent upon the completion of the mount or unmount operation is issued before the mount or unmount operation is completed, the subsequently issued command will fail. This problem is normally resolved by simply retrying the subsequent command. After some number of retries, the mount or unmount operation will presumably have had sufficient time to complete, and the subsequent command will be successful.

When the mount/unmount and subsequent commands are being manually issued by a user, the solution of retrying the subsequent commands may be sufficient. In the case of automated systems (e.g., media library interface/management systems) that issue these commands, however, there are some problems with this solution. For example, when an automated, synchronous system retries the subsequent command before the preceding mount/unmount command is complete, an error message may be generated—repeated retries may result in a large number of error messages. A user may interpret the large number of error messages as an indication of a malfunction in the system, rather than a normal and expected result of the retries, and may consequently feel that it is necessary to interrupt operation of the system to determine the source of the errors. Additionally, the retries increase the resource usage of the system, and the delays between completion of the asynchronous commands and the succeeding retries reduce the efficiency of the system.

It would therefore be desirable to provide a mechanism for enabling a synchronous media library interface/management system to perform or interface with asynchronous mount and unmount operations in a way that eliminates the need to continually retry commands that follow these operations and increases the efficiency of the system.

SUMMARY

Embodiments described herein provide systems and methods for determining completion of asynchronous commands in a media library system and providing an indication of the completion to a synchronous component of the media library system so that commands which are dependent upon the completion can be efficiently issued and executed.

One exemplary embodiment comprises a method implemented in a media library management system that has a computer processor. In this method, a media library management application is executed by the processor. The processor issues a command to the operating system executing on the processor, which in this example is Linux. This initiates an asynchronous filesystem mount operation. Diagnostic information generated by the operating system for the asynchronous filesystem mount operation is communicated to the media library management application. This is accomplished in one embodiment by creating a pipe, creating an I/O thread, and running a process in the I/O thread that reads diagnostic messages from the standard error output of the filesystem mount process, which are then communicated through the pipe to the media library management application. When the filesystem mount process is completed, a corresponding diagnostic message (e.g., "ready for filesystem events") is generated by the operating system and is communicated to the media library management application through the pipe. Until this message is received by the media library management application, commands that are dependent upon the completion of the filesystem mount process are inhibited. After the message indicating completion of the filesystem mount process is received, these dependent commands are allowed to be issued.

The method may further include creating a thread for a wait process that monitors the filesystem process to determine whether the filesystem is currently mounted. When the currently mounted tape and filesystem are no longer needed, the media library management application can issue an unmount command to the operating system. The unmount operation, like the mount operation, is asynchronous. The wait process is therefore used to detect the completion of the operation. When the unmount operation is complete, the wait process detects that the process is no longer running and forwards a notification to the media library management application before the wait process itself terminates. The media library management application is configured to inhibit commands that are dependent upon completion of the unmount operation (e.g., a command to unmount the tape cartridge from the tape drive) until receiving the notification from the wait process. After this notification is received, the media library management application allows these commands to proceed.

Another exemplary embodiment is an archive node appliance which is configured to be coupled between one or more host devices and a media library that may have one or more tape drives (e.g., LTFS-compatible drives). The archive node appliance has a computer processor, and a memory, as well as communications interfaces that can be coupled to the host devices and the media library. The computer processor of the system is configured to execute a media library management application. The media library management application issues a command to the operating system running on the computer processor in order to initiate a filesystem mount operation. The filesystem mount operation is asynchronous. In this embodiment, the media library management application obtains diagnostic information generated by the operating system for the filesystem mount operation by executing a process that reads the standard error output of the filesystem mount operation and communicates this information to the media library management application through a pipe that it created for this purpose. The media library management application inhibits commands that are dependent upon completion of the asynchronous filesystem mount operation until this operation is complete. Completion of the operation is indicated by the diagnostic messages of the operating system. When the media library management application receives an indication that the filesystem mount operation is complete, it enables the hosts to access the tape in the tape drive using the now-mounted filesystem.

The archive node appliance may be configured to detect completion of an asynchronous unmount operation as well. The media library management application running on the archive node appliance creates a thread in which a wait process is started. The wait process monitors the filesystem process to determine whether the filesystem is currently mounted. When an unmount command is issued to the operating system, an asynchronous unmount operation is initiated. When the unmount operation is complete, this is detected by the wait process, which sends a notification to the media library management application. After sending this notification, the wait process itself terminates. The archive node appliance inhibits commands that are dependent upon completion of the unmount operation (e.g., commands to unmount the tape cartridge from the tape drive) until receiving the notification from the wait process. After this notification is received, the archive node appliance allows these commands to proceed.

Yet another embodiment comprises a computer program product. This product consists of a non-transitory computer readable medium that stores a set of instructions that are executable by the computer processor of an archive node appliance. The instructions cause the archive node appliance to perform a method such as is described above. This method includes issuing a command to the archive node appliance's operating system to initiate an asynchronous filesystem mount operation. A pipe is created to enable an I/O process to read diagnostic messages from the standard error output of the filesystem mount process. When the media library management application receives a diagnostic message indicating that the filesystem mount process is completed, commands that are dependent upon the completion of the filesystem mount process are allowed to be issued. Before the message is received, these commands are inhibited.

The computer program product may detect completion of an asynchronous unmount operation by creating a thread and running a wait process in this thread. The wait process monitors the filesystem process to determine whether the filesystem is currently mounted. While the filesystem process is running, commands (e.g., commands to unmount a tape cartridge from the tape drive) that are dependent upon the completion of a filesystem unmount process are inhibited. When the unmount operation is completed, the wait process sends a notification to the media library management application and then terminates. The computer program product then allows commands that are dependent upon the completed unmount process to proceed.

Other alternative embodiments are also possible.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

It will be recalled from the above discussion that in many instances it may be desired to provide a file system utilizing media libraries. To that end, attention is now directed to systems and methods for implementing a file system utilizing a tape library. In particular, embodiments may present a network based file system to one or more host devices. These host devices may utilize the network based file system to organize, store, read or perform other operations in association with files. These files may be managed in conjunction with a tape library. Specifically, commands in a network file system protocol may be received. These commands may be associated with operations to be performed on files, including operations associated with the organization, storage or retrieval of those files. Library control functionality that allows tapes in the tape library to be tracked and tapes to be moved into and out of drives and storage slots is utilized to manage the tape library.

LTFS (including Library LTFS) may be employed in conjunction with the tape library, such that the tapes in the tape library may be formatted using LTFS. Accordingly, operations with respect to the files on the tapes in the tape library may be performed using LTFS. A mapping may be maintained between the files visible through the networked based file system presented to the host devices and the corresponding location of those files on an LTFS tape in the tape library. It should be noted here that while embodiments as discussed include a tape library having tapes formatted according to LTFS, other types of media libraries that utilize media of the same or different type, where the media may be formatted according to the same or another type of file system may be employed in other embodiments.

To increase performance, embodiments of such a system may include a data store, which may be on a storage medium that is relatively faster for random accesses such as a disk. Files that are stored by the host devices using the networked based file system may initially be stored on the disk. These files are subsequently migrated to tapes in the tape library. Once a file has been migrated, all or a portion of that file may be deleted from the disk. When a file is subsequently accessed, it can be determined if the file is on the disk or stored on tape. The file can then be accessed from the disk, a tape or a combination of the two. File operations performed through the network file system can occur on files in the data store, rather than directly on the file on tape.

When it is desired to use an LTFS tape, a tape cartridge must first be mounted in an LTFS-compatible tape drive. A library control application (referred to as a device arbiter in one embodiment) communicates with a robotic media changer device (a "library robot") to move a designated tape cartridge from a designated storage location (a "slot") to the tape drive. After the tape has been mounted in the drive, Linux must mount the LTFS filesystem. In one embodiment, this is accomplished by invoking an LTFS executable. After the LTFS filesystem is mounted, the filesystem can receive and process standardized filesystem commands, and generate corresponding commands that are forwarded to the driver application. The driver application, in turn, forwards drive-specific commands to the drive. The drive then performs the appropriate actions associated with the filesystem commands (e.g., writing data to the tape mounted in the drive). When the mounted tape is no longer needed, the LTFS filesystem is unmounted, and the tape is removed from the tape drive. Other tapes may be mounted as needed and unmounted according to this same procedure.

The mounting and unmounting of the LTFS filesystem is achieved in some embodiments through the use of Linux commands. The Linux mount and unmount operations are asynchronous. No notification is provided by Linux upon completion of these operations. While other commands may be issued during the pendency of the mount and unmount operations, ones of these commands that depend upon completion of the mount and unmount operations will fail if the mount and unmount operations have not completed. The present systems therefore pipe diagnostic information generated by Linux in connection with the mount and unmount operations to the library management system application. This information enables the library management system application to determine whether or not the mount and unmount operations have completed. As a result, the library management system application can issue mount- and unmount-dependent commands upon completion of these operations, rather than retrying failed commands repeatedly until they succeed.

Figure 1:
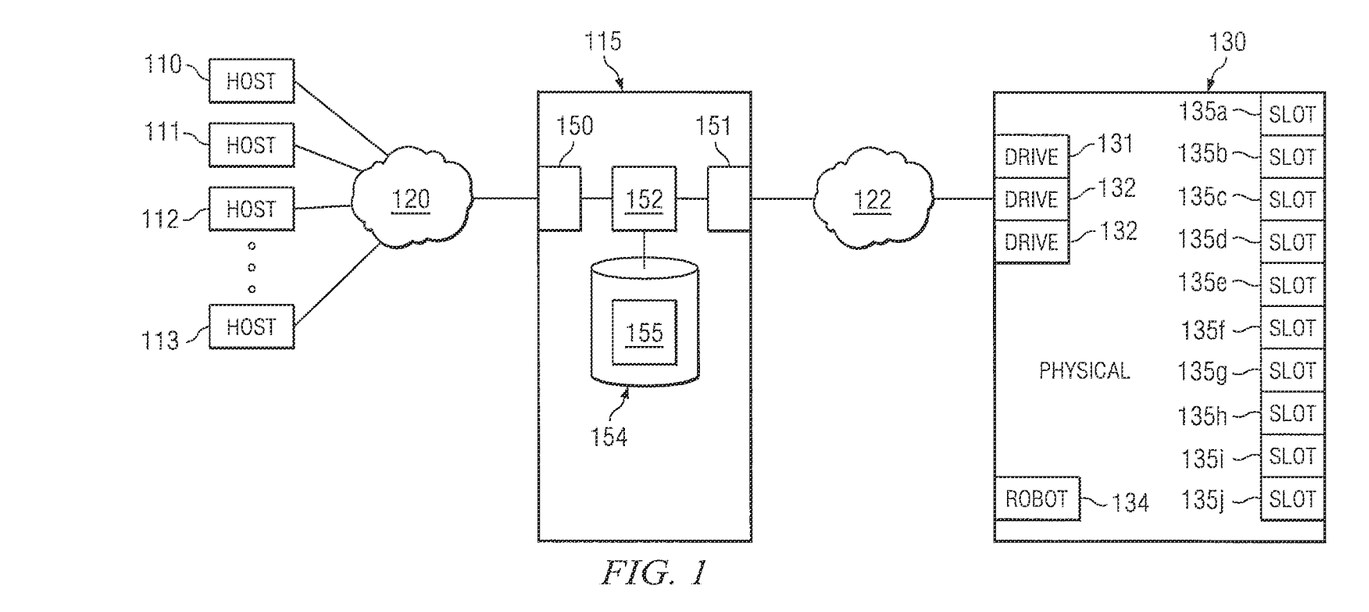
FIG. 1 is a diagrammatic representation of one embodiment of system comprising an Archive Node Appliance.

FIG. 1 is a diagrammatic representation of a system in which a media library is managed to present a network based file system to a plurality of hosts (i.e., host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this embodiment, hosts 110, 111, 112 and 113 are coupled to an Archive Node Appliance 115 via network 120. Network 120 can comprise the Internet, a LAN, a WAN, a SAN, a wireless network, or any other communications link, network or protocol known in the art. For example, network may comprise an Ethernet based network employing TCP/IP.

Archive Node Appliance 115 is coupled to media library 130 via network 122 (Archive Node Appliance 115 and media library 130 may be collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in this embodiment, it should be understood that Archive Node Appliance 115 can be implemented in a variety manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. The tape cartridges are stored in a series of slots when they are not in a drive and a robot moves the magnetic tape cartridges between the drives and slots.

As an example, media library 130 can comprise drives 131-133, robot 134 and slots 135 (individually slots 135a-j). It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that though the embodiment depicts only a single media library, other embodiments may be coupled to, and utilize, multiple media libraries.

Archive Node Appliance 115 comprises a computer processor 152 and a computer readable memory 154 (e.g., RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art.

In operation, computer instructions 155 may include a library management system application that is executable by computer processor 152, such that Archive Node Appliance 115 can present a network based file system (i.e., a file system accessible over a network) to hosts 110, 111, 112, 113 that allows these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any another type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5, LTO-6 compliant drives and tapes in media library 130 may be formatted according to LTFS (for example, as disclosed in the Linear Tape File System Format Specification Version 2.0, or other version by IBM, hereby incorporated by reference in its entirety). In one embodiment, the drives may be manufactured by one or more vendors. In other embodiments, the drives may be compliant with other types of tapes and the tapes may be formatted according to other tape file systems.

Computer instructions 155 may be executable to store files received through the networked based file system on the LTFS tapes in the media library 130 and maintain mapping information between the files visible through the network based file system and the location of those files in the media library. Computer instructions 155 may include LTFS executables for a single vendor, or for multiple vendors. In one embodiment, computer instructions 155 includes LTFS executables for several different vendors, and also includes instructions that query the LTFS-compatible drives for information that determines which of the LTFS executables should be mounted for each drive in order to properly control the drives.

The files visible through the network based file system can be files stored at an intermediate location (e.g., a disk based data store or memory). When a file visible through the network based file system is accessed, computer instructions 155 can be executed to provide access to the file from the intermediate location. File operations can thus occur on the file at the intermediate location rather than directly on the file on the tape.

In some cases, the file may not reside entirely in the intermediate storage when the file is accessed. Therefore, the computer instructions 155 can also be executable to determine the location of the accessed file in the media library 130 using the mapping information, locate and load the correct tape into a drive, invoke an LTFS executable for the drive, mount the LTFS filesystem and access the file to, for example, read the remainder of the file into the intermediate storage.

To increase performance, in some embodiments, it may be desired to store files on computer readable memory 154 when they are initially received, and migrate these files to the media library 130 at a later point. Computer instructions 155 may therefore be executable to store files stored by hosts using the network based file system to the computer readable memory 154. At some later point, the computer executable instructions 155 may be executable to migrate the file from the computer readable memory 154 to the media library 130.

In this case, computer executable instructions 155 are executable to maintain mapping information between the files visible through the network based file system and the location of those files on the computer readable memory 154 or the media library 130.

The use of LTFS in conjunction with the media library 130 can afford a number of advantages when employed by an Archive Node Appliance 115 to implement a networked based file system. One important advantage is that the file system structure presented through the file system may be substantially mirrored on the tapes of the media library 130. Accordingly, if there is a failure of the Archive Node Appliance 115 or media library 130, the files on the tapes of the media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software. As noted above, the Archive Node Appliance may be configured to automatically detect the specific types of drives that are present in the media library and invoke appropriate LTFS executables for each of the drives, so that it is not necessary for users to have specific knowledge of the drive types, or to invoke the corresponding LTFS executables for each of the drives.

To put a finer point on some of the advantages offered by embodiments disclosed herein, the functionality and performance of a network based file system may be achieved while simultaneously achieving the benefits of storage on a medium typically used for backup without the need for any type of specific backup application. The use of an Archive Node Appliance may abstract the media library to implement a network based file system and hide the corresponding complexity entailed by the use of such a media library. By using a computer readable memory which is relatively faster for random accesses such as a disk in conjunction with the media library to provide the network based file system the Archive Node Appliance may provide the speed customarily associated with a network based file system by masking the latency of the use of the media library. Simultaneously, the use of such a media library provides the benefit of having files automatically stored on a storage media typically used for backup without specific action by users or the use of a backup application.

Furthermore, the use of LTFS in conjunction with the media library allows the file system created by users using the network based file system to be mirrored on the storage media. Thus, when restoring files from the storage media of the media library in the event of a failure, no specialized structural knowledge is required. The files on the storage media are in the locations where they were placed by the users in conjunction with the network based file system. Moreover, since LTFS is commonly supported data on the storage media may be easily accessed without the need for specialized software such as a backup application. Still further, because the Archive Node Appliance is configured to identify the types of the drives in the media library and to invoke the proper LTFS executables for the drives, the Archive Node Appliance enables the use of different vendors' drives without requiring the user to have any foreknowledge of the drives or the corresponding executables.

It should be noted that the various embodiments of the Archive Node Appliance may have different architectures. These architectures may have different storage capacities, data and communication interfaces and other characteristics and components that are designed or optimized for their respective applications. Similarly, embodiments of the Archive Node Appliance may be implemented in substantially any form factor that may be desired.

Figure 2:
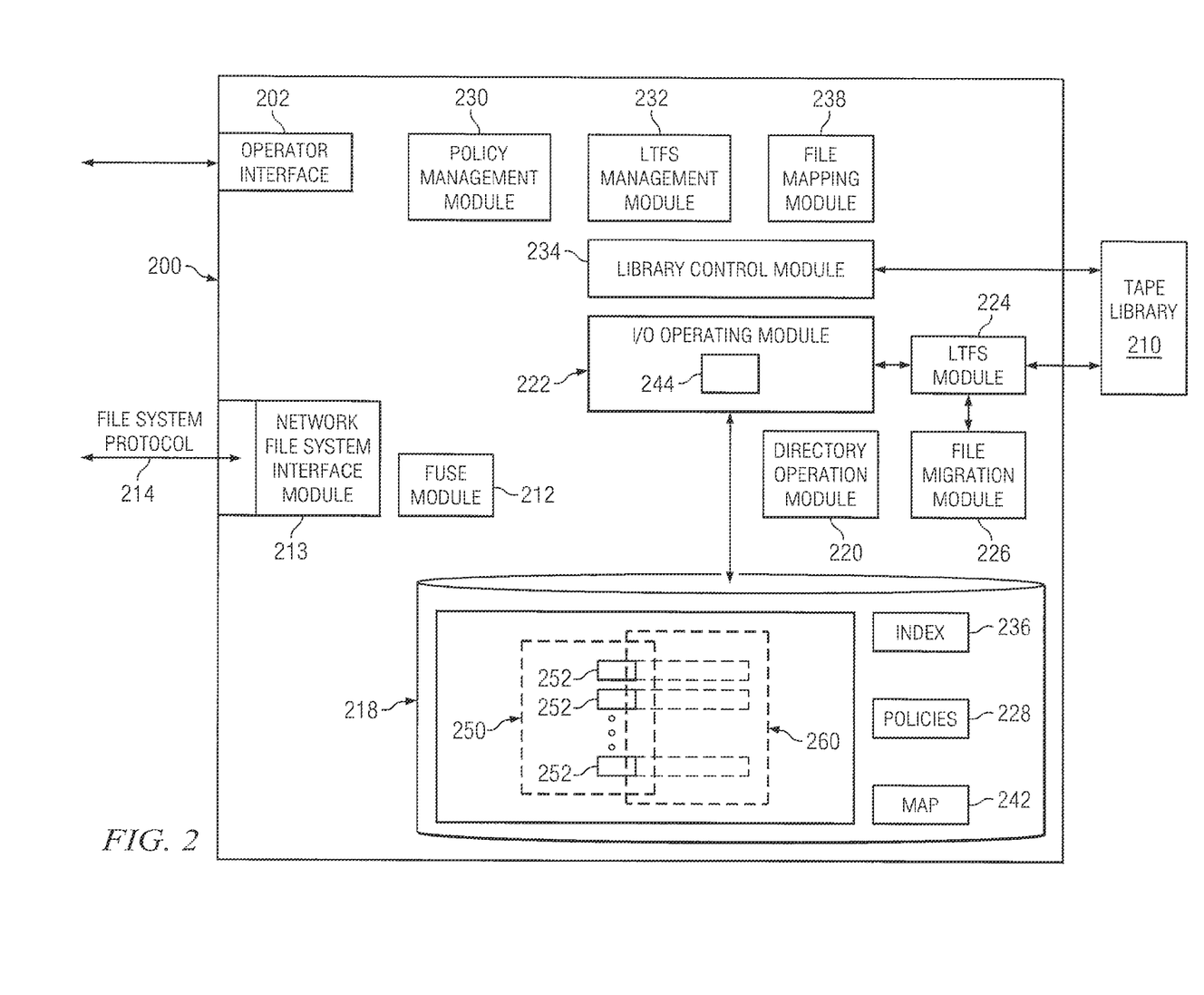
FIG. 2 is a diagrammatic representation of one embodiment of an Archive Node Appliance.

Turning now to FIG. 2, one embodiment of a functional architecture for an Archive Node is depicted. Archive Node Appliance 200 may provide an operator interface 202 through which the Archive Node Appliance 200 may be configured. Such an operator interface 202 may be provided, for example, using a network based interface such as a set of web pages or the like. Archive Node Appliance 200 is coupled to tape library 210, comprising a set of LTO-5, LTO-6 or other tape compliant drives some of which may be LTFS (or other tape file system) formatted tapes. In one embodiment, each tape in tape library 210 may be used to store data that is compressed, data that is encrypted, data that is both compressed and encrypted or data that is neither compressed nor encrypted.

Archive Node Appliance 200 comprises Filesystem in Userspace (FUSE) module 212 that may present a file system to a local operating system. A network file system interface module 213 provides access to all or a portion of the FUSE file system as one or more shared volumes (e.g., as a hierarchical file system with directories, etc.) that can be accessed using an interface that operates according to network file system protocol 214 such as NFS, CIFS, FTP, REST etc. Data associated with the shared volumes is stored on one or more partitions of data store 218 (a computer readable memory), where the structure of the partitions of the data store 218 may, or may not, correspond to the structure of the shared volumes or to the structure of the file system presented by FUSE module 212.

Directory operations module 220 is configured to process any directory operations that are received by FUSE module 212. I/O operations module 222 is configured to process any input or output operations involved with the reading or the storing of files associated with the file system presented by the FUSE module 212. These operations include, for example, the writing of files to the data store 218, the reading of files from the data store 218, the deletion of files from the data store 218, the reading of files from a tape in the tape library 210 or other operations associated with the data store 218 or tape library 210.

These I/O operations may involve the use of library control module 234, LTFS module 224, LTFS management module 232 and index 236. The location of each tape within the tape library 210 may be maintained in index 236 (e.g., in which slot or drive each tape is located, in which library the tape is located if multiple tape libraries are in use, etc.). Additionally, in one embodiment, what type of data is stored on each tape (encrypted, compressed, neither encrypted nor compressed, etc.) may also be maintained.

Library control module 234 is configured to control the movement of the tapes in the tape library 210, including ejecting the tapes from the drives of the tape library 210, and the movement of tapes to and from slots of the tape library 210 and in and out of drives of the tape library using the robot. LTFS management module 232 is configured to mount or unmount the LTFS file system on a particular tape drive of the tape library 210. LTFS module 224 is configured to perform LTFS operations with respect to an LTFS mounted file system.

Because the different LTFS-compatible drives in the media library may require different LTFS executables, LTFS management module 232 is configured to determine the types of the different drives and then, for each drive, invoke the appropriate executable and mount the LTFS filesystem. LTFS management module 232 uses SCSI Inquiry commands to query each drive for identifying information, such as the vendor, product name, product revision and serial number. For each drive, after a tape cartridge has been mounted in the drive, LTFS management module 232 selects the appropriate LTFS executable for the drive and runs the executable for the drive. When the executable has been invoked, commands associated with tape operations of a particular drive are processed by the filesystem mounted for that drive. The executable forwards commands to the appropriate driver, which forwards to the drive the specific commands that are appropriate for that drive, causing the drive to perform the desired tape access.

Library control module 234, LTFS module 224, LTFS management module 232 and index 236 may also be utilized by file migration module 226. File migration module 226 is configured to move files from data store 218 to tape library 210 based on policies 228. File mapping module 238 maintains map 242 which correlates a file visible through the FUSE file system to its corresponding location in the tape library 210. Specifically, a mapping between the location (for example the path) and name of the file with respect to the FUSE file system, the name and location of that file in the data store 218 and the name and location of that file on one or more tapes in the tape library 210 may be maintained in map 242.

Policies 228 may, or may not be, user configured and may be associated with storage of the files or the migration of files from the data store 218 to tapes in the tape library 210. Such policies may specify, for example, how long to wait before migrating a file (referred to herein as a migration timeout period), whether the files are to be replicated when migrated (e.g., stored in conjunction with multiple Archive Nodes as will be elaborated on in more detail), how many copies of the file to keep, where the multiple copies are to be kept on different tapes, whether the file is to be encrypted or compressed, etc. The policies 228 may be defined with respect to the directories presented with respect to the FUSE module 212 such that those policies may be defined with respect to all files within that directory. Policy management module 230 allows these policies to be managed (e.g., created, updated, defined, deleted, modified, etc.) by a user or otherwise. Policies can be defined at any level of the directory structure provided by FUSE module 212. Because a directory presented by FUSE module 212 may be presented as a shared volume by network file system interface module 213, a policy that applies to the directory may also apply to the share.

In operation then, Archive Node Appliance 200 may present a network based file system accessible through an interface, where the files associated with the network based file system may be stored on the tape library 210 according to a file system structure that substantially mirrors the file system structure of the presented network based file system. A user may therefore view and otherwise access the data stored in the tape library 210 in the same manner as if the data were stored in a randomly accessible directory structure. Archive Node Appliance 200 further simplifies the user's interaction with the tape library 210 by automatically identifying the drive types and executing corresponding instructions that cause the drives to each be accessed using appropriate vendor-specific LTFS executables.

Figure 3:
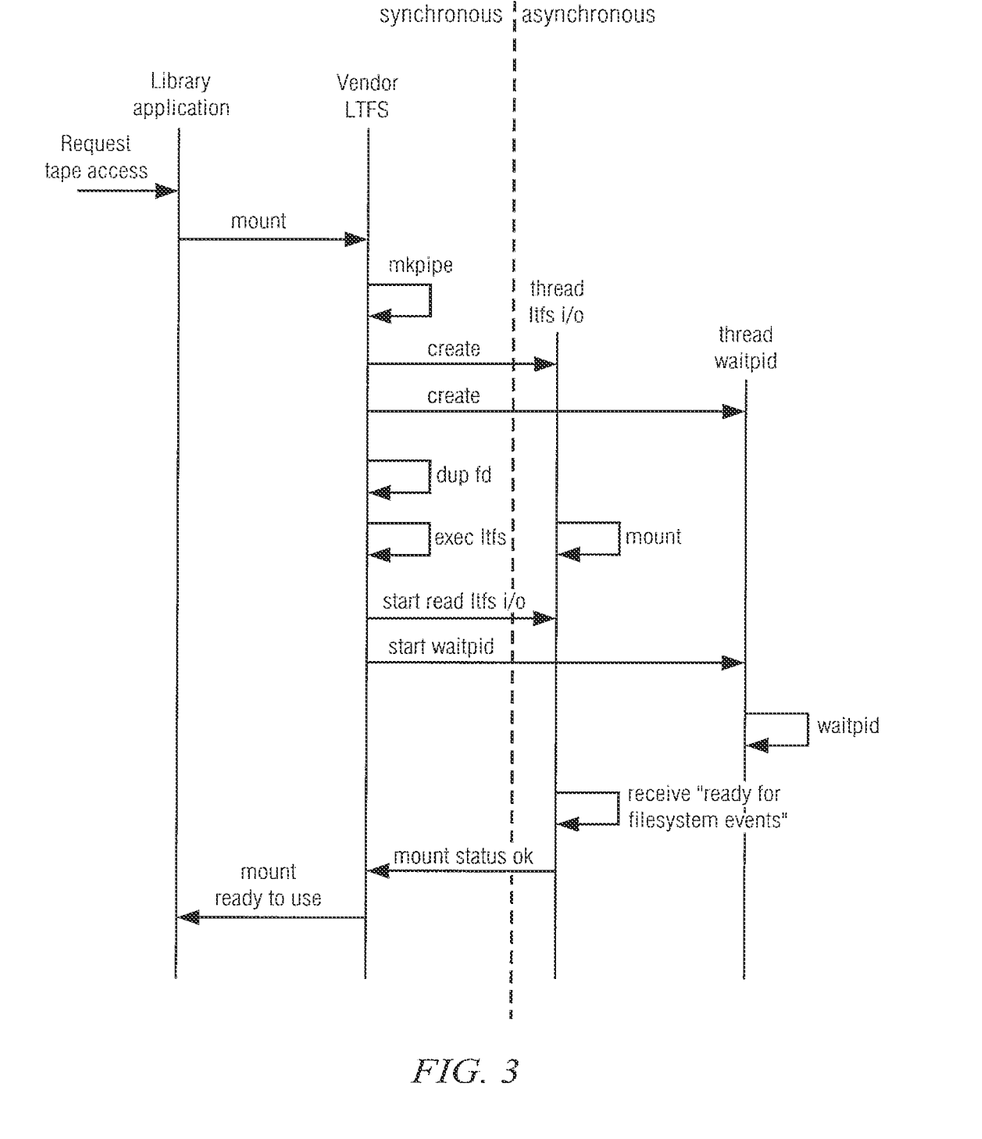
FIG. 3 is a diagrammatic representation of a method for mounting a filesystem in a partially synchronous and partially asynchronous manner according to one embodiment.

Referring to FIG. 3, a diagrammatic representation of a method for mounting a filesystem in a partially synchronous and partially asynchronous manner according to one embodiment is shown. In this embodiment, a media library management application communicates with a host to enable access to a media library that includes one or more LTFS-compatible tape drives. In response to receiving a communication from a host, the media library management application determines that it is necessary to access a particular LTFS tape and directs the library robot to mount the corresponding tape cartridge in a selected one of the tape drives. Before the tape can be accessed, it is also necessary to mount the LTFS filesystem for the tape. The mounting of the filesystem involves both synchronous operations (generally those performed by the media library management application) and asynchronous operations (particularly the "mount" and "waitpid" operations performed by the Linux operating system in this embodiment). The operations to the left of the dashed line in the figure are synchronous, while the operations to the right of the dashed line are asynchronous.

As noted above, it is desired to avoid the uncertainty associated with the asynchronous completion of the mount operation by the operating system and the resulting need to retry subsequent commands that fail because the mount operation is incomplete. The media library management application therefore creates a pipe (using the "mkpipe" command) that will enable Linux diagnostic messages to be communicated to the media library management application. The media library management application then creates two threads. The first thread ("LTFS I/O") is used to communicate Linux diagnostic messages to the media library management application. This will allow the media library management application to determine when the mounting of the filesystem has completed. The second thread ("waitpid") is used to determine when the unmounting of the filesystem has completed (as described in more detail in connection with FIG. 4).

After these two threads have been created, the LTFS executable is invoked ("exec LTFS") to initiate mounting of the LTFS filesystem. The process identifier ("pid") of the LTFS process is noted for use in the "waitpid" thread. The media library management application then duplicates the file descriptor for the standard error output associated with the LTFS process. This enables the pipe to direct the diagnostic messages generated during execution of the process to the media library management application instead of a terminal (to which the standard error output is directed by default). When the media library management application then issues a command ("start read LTFS I/O") that starts the communication of the diagnostic messages from the LTFS I/O thread through the pipe to the media library management application.

After the media library management application has started the communication of diagnostic information through the pipe to the media library management application, the management application then starts the process "waitpid" in the "waitpid" thread. The media library management application starts the waitpid process with the process identifier of the LTFS executable. The waitpid process simply waits on the LTFS process and notifies the media library management application when the LTFS process terminates (after the LTFS filesystem is unmounted—see FIG. 4).

The media library management application monitors the diagnostic information received from the operating system through the pipe until management application receives a message indicating that the mounting of the LTFS filesystem is complete. In this embodiment, the operating system generates the message "ready for filesystem events". This message (or an equivalent message) is passed via the pipe to the media library management application, which interprets the message as an indication that the mounting of the LTFS filesystem is complete. The media library management application then enables the host's use of the mounted LTFS filesystem to access files on the tape that is mounted in the tape drive.

Figure 4:
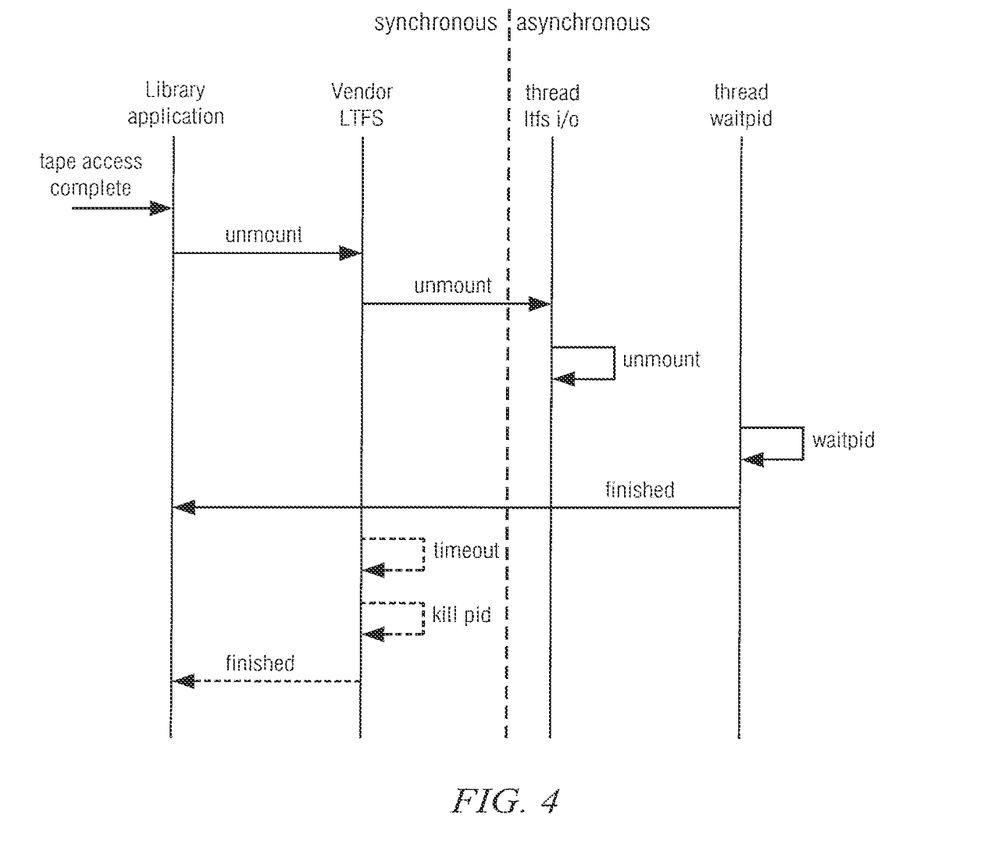
FIG. 4 is a diagrammatic representation of an exemplary method for unmounting a filesystem in a partially synchronous and partially asynchronous manner.

Referring to FIG. 4, a diagrammatic representation of an exemplary method for unmounting a filesystem in a partially synchronous and partially asynchronous manner is shown. As in FIG. 3, the operations to the left of the dashed line in the FIG. 4 are synchronous, while the operations to the right of the dashed line are asynchronous.

In this embodiment, it is assumed that the media library management application has already created a thread in which the process "waitpid" is running. The waitpid process is running in a thread "waitpid". The waitpid process waits on a currently mounted LTFS filesystem (which is identified by a process identifier, pid). The "LTFS I/O" thread that is shown in FIG. 3 is not included in FIG. 4 because, as discussed below, the completion of the filesystem unmount operation is detected through the use of the waitpid process rather than through the monitoring of operating system diagnostic messages.

When the currently mounted tape and filesystem are no longer needed, an "unmount" command is issued by the media library management application. A corresponding asynchronous unmount operation is then initiated by the operating system. Until the unmount operation is complete, the filesystem process (and consequently the waitpid process) remains pending. When the unmount operation is complete, the LTFS filesystem process terminates. Because the filesystem process is no longer running, the waitpid process sends a notification to the media library management application and then terminates. When the media library management application receives the notification from the waitpid process, it knows that the filesystem unmount operation is complete. The media library management application can then proceed to issue commands that are dependent upon the completion of the unmount operation, such as a command to unmount the tape that had previously been accessed using the now-unmounted filesystem. Until the filesystem is unmounted, these commands are inhibited by the media library management application. This eliminates the need to repeatedly retry commands to unmount the tape when these commands fail due to an incomplete filesystem unmount operation.

FIG. 4 includes two processes that are depicted using dotted lines. These processes are shown using dotted lines because they may not be used. While the filesystem unmount operation is asynchronous and may require a variable amount of time to complete, there may be an upper limit on this interval, such that if the upper limit is exceeded, it may reasonably be assumed that an error has occurred in the process and that the process will not complete normally. The media library management application may therefore be configured to start a timeout process concurrently with the unmount process in order to provide a notification to the application when the unmount operation has exceeded the predetermined time limit (i.e., when the unmount operation has "timed out"). If the filesystem unmount operation times out, the media library management application may start a "kill pid" process that terminates the unmount process.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for media library management, comprising:
a media library management application communicating with a host device to enable the host device access to a media library that includes a plurality of media selectively mountable in one or more drives of the media library, the media library management application executing on an appliance having a computer processor, a memory coupled to the computer processor, and an operating system executing on the computer processor;
the media library management application initiating an unmount process to unmount a currently mounted medium of the plurality of media in the media library from a drive in the media library, the currently mounted medium having a currently mounted filesystem;
responsive to the media library management application initiating the unmount process, the operating system initiating an unmount operation to unmount the currently mounted filesystem, wherein until the unmount operation is complete, a wait process running in a monitor thread created by the media library management application and a filesystem process remain pending, the wait process configured to monitor the filesystem process for a change in state, wherein when the unmount operation is complete, the filesystem process terminates;
responsive to termination of the filesystem process, the wait process sending a notification to the media library management application; and
responsive to receiving the notification from the wait process, the media library management application issuing one or more commands that are dependent upon completion of the unmount operation.

2. The method according to claim 1, wherein the media library management application is configured to inhibit commands that are dependent upon completion of the unmount operation until the notification from the wait process is received.

3. The method according to claim 1, wherein the one or more commands include a command to unmount the currently mounted medium.

4. The method according to claim 1, wherein the media library management application starts a timeout process concurrently with the unmount process.

5. The method according to claim 4, wherein the media library management application starts a kill process that terminates the unmount process when the unmount operation has exceeded a predetermined time limit per the timeout process.

6. The method according to claim 1, wherein the wait process is configured to detect completion of the unmount operation.

7. The method according to claim 1, wherein the wait process terminates after the notification is sent.

8. An appliance configured to be coupled between one or more host devices and a media library that includes a plurality of media selectively mountable in one or more drives of the media library, the appliance comprising:
a computer processor;
a memory coupled to the computer processor;
an operating system executing on the computer processor; and
a media library management application executing on the computer processor and communicating with the one or more host devices to enable the one or more host devices access to the media library;
wherein the media library management application is configured to initiate an unmount process to unmount a currently mounted medium of the plurality of media in the media library from a drive in the media library, the currently mounted medium having a currently mounted filesystem;
wherein, responsive to the media library management application initiating the unmount process, the operating system initiates an unmount operation to unmount the currently mounted filesystem;
wherein, until the unmount operation is complete, a wait process running in a monitor thread created by the media library management application and a filesystem process remain pending, the wait process configure to monitor the filesystem process for a change in state;
wherein when the unmount operation is complete, the filesystem process terminates;
wherein, responsive to termination of the filesystem process, the wait process sends a notification to the media library management application; and
wherein, responsive to receiving the notification from the wait process, the media library management application issues one or more commands that are dependent upon completion of the unmount operation.

9. The appliance of claim 8, wherein the media library management application is configured to inhibit commands that are dependent upon completion of the unmount operation until the notification from the wait process is received.

10. The appliance of claim 8, wherein the one or more commands include a command to unmount the currently mounted medium.

11. The appliance of claim 8, wherein the media library management application is configured to start a timeout process concurrently with the unmount process.

12. The appliance of claim 11, wherein the media library management application is configured to start a kill process that terminates the unmount process when the unmount operation has exceeded a predetermined time limit per the timeout process.

13. The appliance of claim 8, wherein the wait process is configured to detect completion of the unmount operation.

14. The appliance of claim 8, wherein the wait process terminates after the notification is sent.

15. A computer program product comprising at least one non-transitory computer readable medium storing instructions translatable by a computer processor of an appliance, the appliance configured to be coupled between one or more host devices and a media library that includes a plurality of media selectively mountable in one or more drives of the media library, the instructions when translated by the computer processor:
  - initiate an unmount process for a currently mounted medium of the plurality of media in the media library, the currently mounted medium having a currently mounted filesystem;
  - responsive to the unmount process, initiate an unmount operation to unmount the currently mounted filesystem;
  - until the unmount operation is complete, continue to run a filesystem process and to run a wait process in a monitor thread, the wait process configured to monitor the filesystem process for a change in state, wherein when the unmount operation is complete, the filesystem process terminates and the wait process terminates after sending out a notification; and
  - responsive to the notification from the wait process, issue one or more commands that are dependent upon completion of the unmount operation.

16. The computer program product of claim 15, wherein the instructions when translated by the computer processor inhibit commands that are dependent upon completion of the unmount operation until the notification from the wait process is received.

17. The computer program product of claim 15, wherein the one or more commands include a command to unmount the currently mounted medium.

18. The computer program product of claim 15, wherein the instructions when translated by the computer processor start a timeout process concurrently with the unmount process.

19. The computer program product of claim 18, wherein the instructions when translated by the computer processor start a kill process that terminates the unmount process when the unmount operation has exceeded a predetermined time limit per the timeout process.

20. The computer program product of claim 15, wherein the wait process is configured to detect completion of the unmount operation.

* * * * *